(12) United States Patent
Korchev et al.

(10) Patent No.: US 9,501,839 B1
(45) Date of Patent: Nov. 22, 2016

(54) METHODS AND SYSTEMS FOR DETECTING MOVING OBJECTS IN A SEQUENCE OF IMAGE FRAMES PRODUCED BY SENSORS WITH INCONSISTENT GAIN, OFFSET, AND DEAD PIXELS

(71) Applicant: The Boeing Company, Chicago, IL (US)

(72) Inventors: Dmitriy Korchev, Irvine, CA (US); Yuri Owechko, Newbury Park, CA (US); Hyukseong Kwon, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 56 days.

(21) Appl. No.: 14/722,366

(22) Filed: May 27, 2015

(51) Int. Cl.
*G06K 9/00* (2006.01)
*G06T 7/20* (2006.01)
*G06T 7/00* (2006.01)
*G06T 7/40* (2006.01)

(52) U.S. Cl.
CPC ............... *G06T 7/204* (2013.01); *G06T 7/003* (2013.01); *G06T 7/408* (2013.01); *G06T 2207/10016* (2013.01)

(58) Field of Classification Search
CPC ............... G06T 7/20; G06T 7/00; G06T 7/40
USPC ........................................................ 382/107
See application file for complete search history.

(56) References Cited

U.S. PATENT DOCUMENTS

2012/0236133 A1* 9/2012 Gallagher .......... H04N 13/0018
348/60

OTHER PUBLICATIONS

Lopez-Alonso, et al., "Bad pixel identification by means of principal components analysis", SPIE, Opt. Eng. 41(9) 2152, 2157, Sep. 2002.*
Means, et al., "Adaptive Infrared Non-Uniformity Correction", www.dtic.mil/cgi-bin/GetTRDoc?AD=ADA390347 Feb. 1999.*
Yao, et al., "A novel method for real-time multiple moving targets detection from moving IR camera", Pattern Recognition, 2008. ICPR 2008.
Braga-Neto, et al., "Automatic target detection and tracking in forward-looking infrared image sequences using morphological connected operators", SPIE, Journal of Electronic Imaging vol. 13, Issue 4, Oct. 2004.

(Continued)

*Primary Examiner* — Gregory F Cunningham
(74) *Attorney, Agent, or Firm* — McDonnell Boehnen Hulbert & Berghoff LLP (57) ABSTRACT

Systems and methods of detecting dead pixels of image frames are described including receiving a sequence of image frames, aligning, from the sequence of image frames, pairs of image frames, and for a given pair of image frames, determining differences in intensity of corresponding pixels between the aligned pair of image frames. The method also includes, based on the differences in intensity of corresponding pixels between the aligned pair of image frames, generating mask images indicative of areas in the pairs of image frames having moving objects. The method further includes determining, within the mask images, common pixel locations indicative of areas in the pairs of image frames having moving objects over a portion of the sequence of image frames, and based on a number of the common pixel locations for a given pixel location being above a threshold, identifying the given pixel location as a dead pixel.

20 Claims, 7 Drawing Sheets

(56) References Cited

OTHER PUBLICATIONS

Verdun, et al., "Detection of Low-Contrast Objects: Experimental Comparison of Single- and Multi-Detector Row CT with a Phantom", Radiology 2002; 223:426-431.
Bradtke, et al., "Linear Least-Squares Algorithms for Temporal Difference Learning", Machine Learning, 22, 33-57, 1996.
Davies, et al., "Detection and Tracking of Very Small Low Contrast Objects", Proceedings of the 9th British Machine Vision Conference. ISBN 1-901725-04-9, pp. 599-608. Sep. 1998.
Vaswani, et al., "Moving Object Detection and Compression in IR Sequences", Computer Vision Beyond the Visible Spectrum Advances in Pattern Recognition 2005, pp. 141-165.
Bhattacharya, et al., "Moving Object Detection and Tracking in Forward Looking Infra-Red Aerial Imagery", in R. Hammoud et al. (eds.), Machine Vision Beyond Visible Spectrum, 221 Augmented Vision and Reality, 1, DOI: 10.1007/978-3-642-11568-4_10, © Springer-Verlag Berlin Heidelberg 2011.
Mudau, et al., "Non-uniformity correction and bad pixel replacement on LWIR and MWIR images", IEEE, Electronics, Communications and Photonics Conference (SIECPC), 2011.
Hess, An Open Source SIFT Library. ACM MM, 2010.
Castellano, et al., "Moving Target Detection in Infrared Imagery Using a Regularized CDWT Optical Flow", Conference: Computer Vision Beyond the Visible Spectrum: Methods and Applications, 1999. (CVBVS '99) Proceedings. IEEE Workshop on Source.
Zhu, et al., "A Moving IR Point Target Detection Algorithm Based on Reverse Phase Feature of Neighborhood in Difference Between Neighbor Frame Images", Chinese Journal of Aeronautics, vol. 9, No. 3, Aug. 2006.
Zhou, "Low-Contrast Lesion Detection in Tomosynthetic Breast Imaging", Dissertation Presented to Stony Brook University, The Graduate School, 2007.

* cited by examiner

METHODS AND SYSTEMS FOR DETECTING MOVING OBJECTS IN A SEQUENCE OF IMAGE FRAMES PRODUCED BY SENSORS WITH INCONSISTENT GAIN, OFFSET, AND DEAD PIXELS

FIELD

The present disclosure relates generally to detection of moving objects within a sequence of image frames, and more generally to, detecting moving objects in video produced by sensors that have inconsistent gain, offset, and may include dead pixels.

BACKGROUND

Optical or image capture sensors are expensive and difficult to fabricate perfectly, and so in operation, such sensors often produce outputs that have a number of dead pixels due to manufacturing defects. A dead pixel may be a pixel (or area) in an image that includes data unrelated to an observed aspect of the environment. Dead pixels may refer to defects in the sensor that result in outputs being dark spots, bright spots, or inconsistent with respect to intensity of the observed aspect in the environment. Thus, the dead pixel includes unwanted data, or no data at all.

Outputs that include dead pixel data may result in false detections of moving objects in images, which generally is performed by identifying differences between subsequent frames in the images. Background or non-moving aspects of the images have little changes over a given sequence of images, while moving aspects will exhibit identifiable changes. However, dead pixel data that is inconsistent and possibly changing in random manners over the sequence of images, may contribute to detection of false moving images.

SUMMARY

In one example, a method of detecting dead pixels of image frames is described comprising receiving, at a computing device, a sequence of image frames, aligning, from the sequence of image frames, pairs of image frames, and for a given pair of image frames, determining differences in intensity of corresponding pixels between the aligned pair of image frames. The method also includes, based on the differences in intensity of corresponding pixels between the aligned pair of image frames, generating by the computing device mask images indicative of areas in the pairs of image frames having moving objects. The method further includes determining, within the mask images, common pixel locations indicative of areas in the pairs of image frames having moving objects over a portion of the sequence of image frames, and based on a number of the common pixel locations for a given pixel location being above a threshold, identifying the given pixel location as a dead pixel.

In another example, a non-transitory computer readable medium having stored thereon instructions that, upon executed by a computing device, cause the computing device to perform functions is described. The functions comprise receiving a sequence of image frames, aligning, from the sequence of image frames, pairs of image frames, and for a given pair of image frames, determining differences in intensity of corresponding pixels between the aligned pair of image frames. The functions also comprise, based on the differences in intensity of corresponding pixels between the aligned pair of image frames, generating mask images indicative of areas in the pairs of image frames having moving objects, determining, within the mask images, common pixel locations indicative of areas in the pairs of image frames having moving objects over a portion of the sequence of image frames, and based on a number of the common pixel locations for a given pixel location being above a threshold, identifying the given pixel location as a dead pixel.

In another example, a system is described comprising one or more sensors for collecting image frames of an environment, and one or more processors for performing functions. The functions comprise receiving a sequence of image frames from the one or more sensors, aligning, from the sequence of image frames, pairs of image frames, and for a given pair of image frames, determining differences in intensity of corresponding pixels between the aligned pair of image frames. The functions also comprise, based on the differences in intensity of corresponding pixels between the aligned pair of image frames, generating mask images indicative of areas in the pairs of image frames having moving objects, determining, within the mask images, common pixel locations indicative of areas in the pairs of image frames having moving objects over a portion of the sequence of image frames, and based on a number of the common pixel locations for a given pixel location being above a threshold, identifying the given pixel location as a dead pixel.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and the disclosure should not be construed as limited to the embodiments set forth herein.

Within examples, systems and methods of detecting moving objects in sensor data and reducing influence of dead pixels on false detection rates are described. Detecting low contrast, small moving objects in sensor data produced by inconsistent sensors can be a challenging problem due to inconsistency in sensor imagery data produced by high dynamic range sensors, a small size of the objects, and low contrast in output images. Another challenge with some sensor images is that the sensors can be expensive and difficult to fabricate perfectly, and thus, some sensors may produce output images having a number of dead pixels causing false detections.

Examples herein include methods based on normalization of intensities of registered or aligned images to determine differences, and generating a mask representing dead pixels of the sensor that will lead to robust detection of the moving object in a sequence of output images. Robust object or target detection and recognition may be useful in a number of applications, such as path determination for flight trajectory for example. Specifically, objects may be tracked as the objects move within a moving object detection algorithm, and examples herein can be used in combination to further improve detection of the object by removing data due to dead pixels from consideration.

Figure 1:
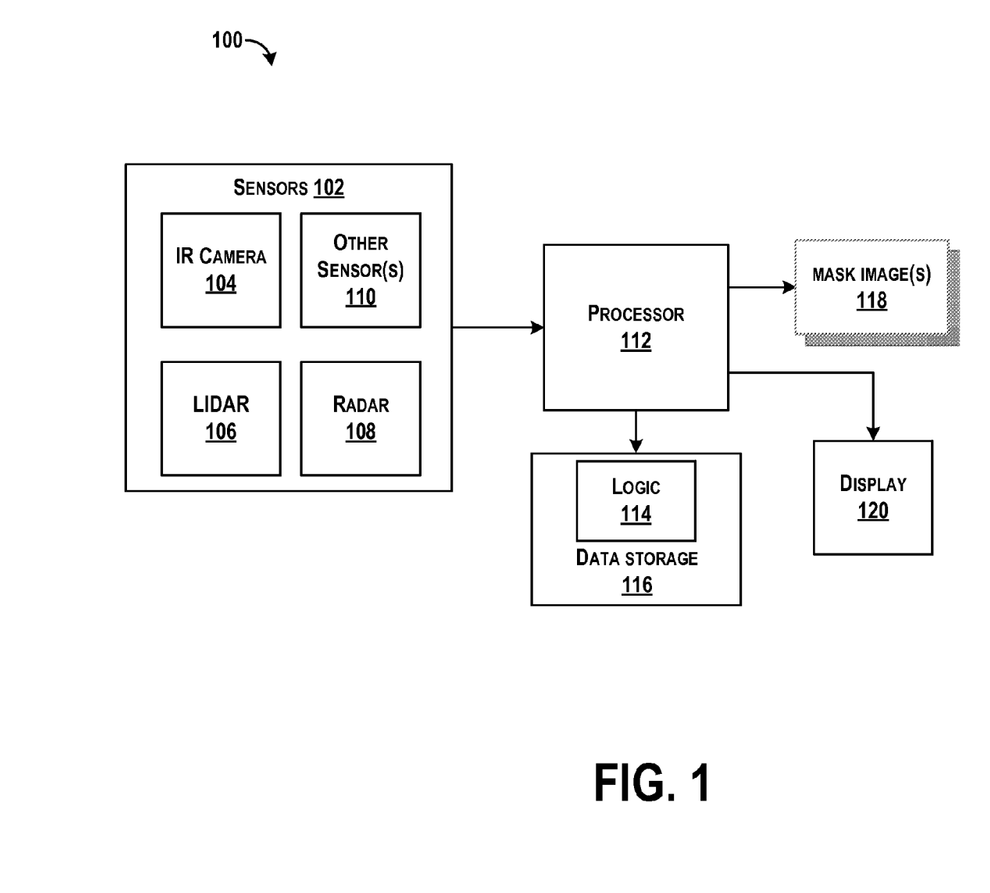
FIG. 1 is a block diagram of an example system for detecting moving objects in video, according to an example embodiment.

Referring now to the figures, FIG. 1 is a block diagram of an example system 100 for detecting moving objects using multiple sensors. The system 100 includes sensors 102, such as an infrared (IR) camera 104, a LIDAR (light detection and ranging) 106, a RADAR (radio detection and ranging) 108, and possibly other IR/EO (electro-optical) sensors 110 that are in communication with a processor 112.

The processor 112 may receive outputs of the sensors 102, and process the outputs according to logic 114 stored in data storage 116 to generate mask images 118. The system 100 may further include a display 120 in communication with the processor 112 to receive and display output images indicative of moving objects.

The system 100 may be representative of a computing device, or may be a portion of another apparatus as well, such as included entirely within an aircraft, or portions of the system 100 may be on an aircraft (e.g., such as the sensors) and portions of the system may be elsewhere or located within other computing devices.

The IR camera 104 may be a long or short wave IR camera configured to generate an image or to capture or collect images of an environment, and output a sequence of image frames.

The LIDAR 106 can estimate distance to environmental features while scanning through a scene to assemble a "point cloud" indicative of reflective surfaces in the environment. Individual points in the point cloud can be determined by transmitting a laser pulse and detecting a returning pulse, if any, reflected from any object in the environment, and then determining a distance to the object according to a time delay between the transmitted pulse and reception of the reflected pulse. A laser, or set of lasers, can be rapidly and repeatedly scanned across portions of the environment to provide continuous real-time information on distances to reflective objects in the environment. Combining measured distances and orientation of the laser(s) while measuring each distance allows for associating a three-dimensional position with each returning pulse. In this way, a three-dimensional map of points (e.g., a point cloud) indicative of locations of reflective features in the environment can be generated for the entire scanning zone. The LIDAR 106 may output point cloud data, or may output images generated using point cloud data, for example.

The RADAR 108 is an object-detection sensor that uses radio waves to determine range, altitude, direction, or speed of objects in an environment. For example, the RADAR may include an antenna that transmits pulses of radio waves or microwaves that bounce off any object in their path. The object returns a portion of the wave's energy to a receiver of the RADAR for estimation or determination of positioning of the object.

The other sensor(s) 110 may include a variety of sensors included on aircraft for navigational purposes, such as other imaging cameras, inertial measurement units (IMUs), temperature sensors, SONAR, or any other array of sensors and optical components.

The processor 112 may receive outputs from the sensors 102 to generate the mask images 118 indicative of moving objects in an environment in which the system 100 may reside. The system 100 may be operable at all times, or on demand by pilots in an aircraft so as to operate an object tracking function, for example. The mask images 118 may be useful for focusing on areas of images that include content representative of moving objects, as well as identifying areas in the images that may include dead pixels.

Within examples, using the system 100 in FIG. 1, changes in a video sequence can be detected, and changes due to moving objects versus changes due to imperfections of sensors used to collect the video can be distinguished. Sensors may output inconsistent data, such as gain and offset that vary between image frames, and some sensors may include dead pixels or output images that otherwise have imperfections due to artifacts on a surface of a lens, for example. To detect changes in the video sequence, video frames may be aligned to remove movement of the sensors or camera, and differences between frames can be identified. Many procedures for frame alignment exist, referred to as registration, and any may be used herein.

For sensors with inconsistent gain and offset resulting in inconsistent distribution of intensities in images, when differences are determined, there may be many differences between frames due to the inconsistent gain and offset. Regression analysis may be used when aligning frames to remove inherent differences in intensities for a remapping of intensities of one frame to another frame. Following remapping, remaining identified differences can be further processed to distinguish between dead pixels causing intensity variations versus objects moving in the video.

Figure 2:
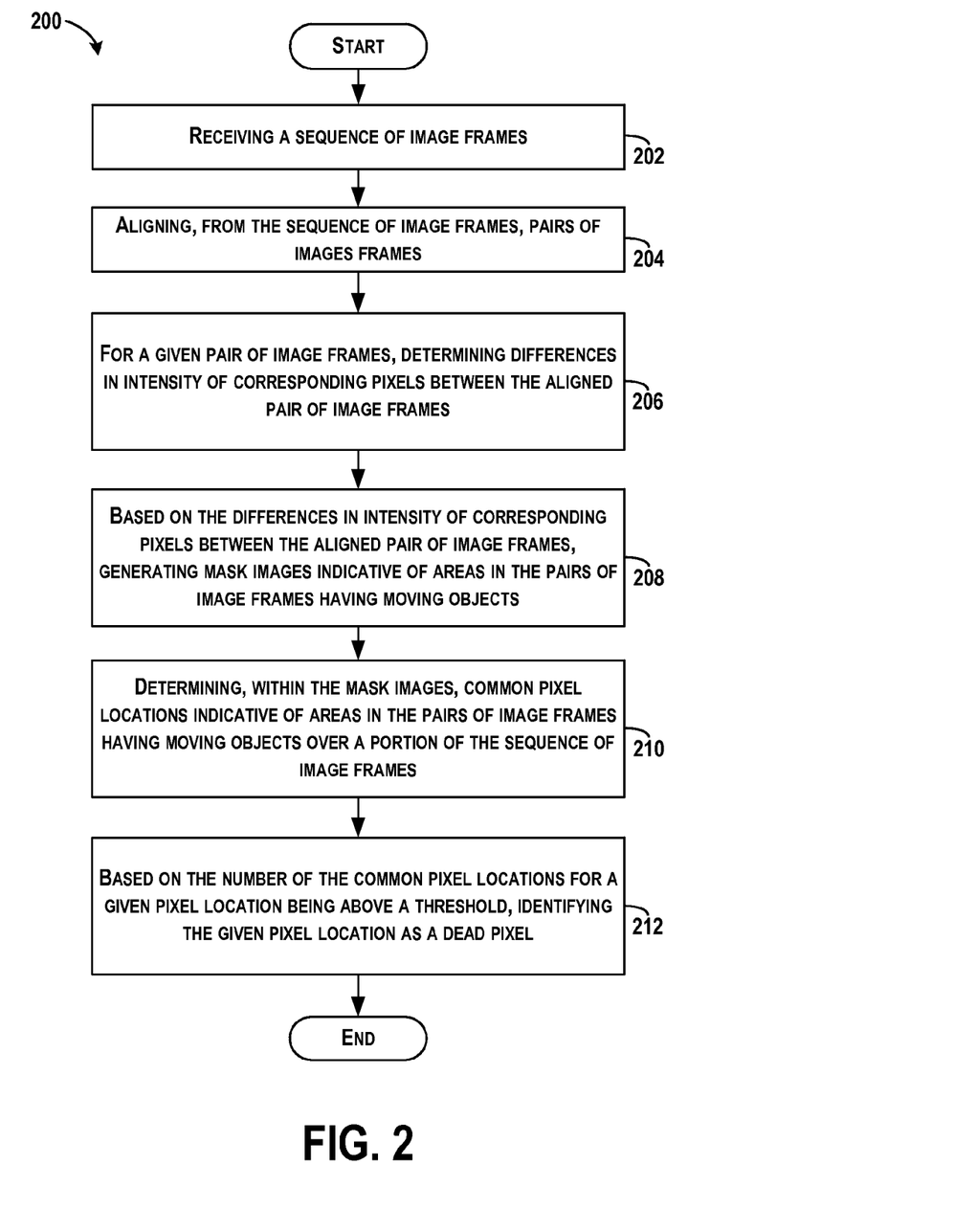
FIG. 2 shows a flowchart of an example method for detecting dead pixels of image frames, according to an example embodiment.

FIG. 2 shows a flowchart of an example method 200 for detecting dead pixels of image frames. Method 200 shown in FIG. 2 presents an embodiment of a method that, for example, could be used with the system shown in FIG. 1, for example, and may be performed by a computing device (or components of a computing device) such as a client device or a server or may be performed by components of both a client device and a server. Example devices or systems may be used or configured to perform logical functions presented in FIG. 2. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions. Method 200 may include one or more operations, functions, or actions as illustrated by one or more of blocks 202-212. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 2 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes receiving, at a computing device, a sequence of image frames. The sequence of image frames may be received from an IR camera over any period of time, and the sequence may include any number of frames at given frame rates.

At block 204, the method 200 includes aligning, from the sequence of image frames, pairs of image frames. Aligning the pairs of image frames includes aligning a first image frame to a second image frame so as to remove motion of a capture device providing the sequence of image frames. Alignment may also be referred to as registration. As one example, if the camera or sensor is in motion, a registration procedure aligns output frames to have stationary parts of the frames in the same places. Alignment may be performed by matching stationary or background image locations over the sequence of frames and adjusting the output image frame into a coordinate frame having a reference to the stationary parts. To do so, translational motion from one frame to another can be determined based on changes in location of the same object from one frame to the other. The translational motion can then be removed from subsequent frames by adjusting an entirety of the image in a direction to counter-act the translation.

In other examples, the method 200 includes normalizing intensity of the aligned pairs of image frames based on a linear regression between intensities of a first image frame and a second image frame for a given pair of image frames. In this manner, intensity values can be adjusted to take into account noise, gain, and offset variations from the sensor that may cause spurious image variations.

At block 206, the method 200 includes for a given pair of image frames, determining differences in intensity of corresponding pixels between the aligned pair of image frames. Within examples, moving objects in a sequence of images are detected by subtracting intensities of corresponding pixels between a current frame and one (or several) of past frames (called normalized reference frames). Since moving objects and the background have different intensities, textures, etc., a difference for the moving objects will be higher versus a difference for stationary objects affected by some noise in the video. In an ideal case, when noise in images is zero, only pixels that correspond to moving objects will produce non-zero differences. Groups of these pixels will define a location of moving objects in the images. In the presence of noise in the images, a threshold can be defined to produce a binary mask for the moving objects in two frames of the sequence. This threshold may be set higher than a level of noise in the images.

At block 208, the method 200 includes based on the differences in intensity of corresponding pixels between the aligned pair of image frames, generating by the computing device mask images indicative of areas in the pairs of image frames having moving objects. Mask images may be useful for filtering out portions of images including non-moving objects.

At block 210, the method 200 includes determining, within the mask images, common pixel locations indicative of areas in the pairs of image frames having moving objects over a portion of the sequence of image frames. The common pixel locations refer to the same or neighboring pixel location in the image, and it is determined which pixel locations consistently have or are categorized as having moving objects.

At block 212, the method 200 includes based on a number of the common pixel locations for a given pixel location being above a threshold, identifying the given pixel location as a dead pixel. The dead pixel includes data unrelated to content of an image representative of an observation, or data indicative of a false moving object. In other examples, dead pixels change in intensity in a way unrelated to an observed object. For example, when the same pixel location continually indicates a moving object over a given sequence, it may be determined by thresholding a sum of intensity values over the sequence that the intensity values of that pixel location are inconsistent due to different offset and gain values for every frame resulting in many changes unrelated to motion of objects. The threshold for the sum of the intensity values over the sequence may be, for example and not limited to, between about 0 or $0.1N*I_{max}$ to $0.9N*I_{max}$, where N is a number of frames in the sequence of image frames and $I_{max}$ is the maximum possible pixel intensity value. Thus, pixels of a sensor may be identified as dead pixels when such inconsistencies are determined.

The method 200 may further include generating a mask representative of dead pixels of the sensor using identified dead pixel locations, and updating the mask representative of the dead pixels of the sensor in real-time as new image frames are received. The mask may then be applied to the sequence of image frames to remove false data indicative of moving objects that is present within or overlaps any of the dead pixel locations. In other examples, data of the given pixel location identified as a dead pixel may be removed from the mask images indicative of areas in the pairs of image frames having moving objects, or areas in the mask images may be marked as having dead pixels, or the dead pixel values can be replaced with interpolations of surrounding pixels, and an indication of the moving objects may be output.

In still other examples, the method 200 may include removing ghost images from the mask images by comparison of a current mask image to a prior mask image for the sequence of image frames. Ghost images are representative of duplicate data created during mask generation, and so such images may be removed. Overlapping regions in the current mask image and the prior mask image can be identified, and the overlapping regions representative of the areas in the pairs of image frames having moving objects can be marked, as well as marking non-overlapping regions as including ghost images.

As described, sensors may produce different offset and gain for every frame, and in some examples, differencing between two frames will produce many changes unrelated to motion of objects. Using differencing methods may work well for cases when a background context of the images does not change much between images. That means that pixels that changed between two frames generally have intensities within a minimum and a maximum intensity of the entire frame. Violation of this rule would break a linear relation between intensities of the pixels in the two frames analyzed. Thus, within examples, mask images can be generated by first determining a minimum value and a maximum value of intensities in the given pair of image frames, and normalizing intensity values of the aligned pairs of image frames based on a conversion factor between intensities of a first image frame and a second image frame for the given pair of image frames. The conversion factor is based on a fraction of differences between the minimum value and the maximum value of intensities for the given pair of image frames. For each pixel of a second image frame, a difference between an actual intensity value and a normalized intensity value is determined, and based on the difference being greater than a specified threshold, a pixel location for the pixel is identified as having a moving object.

In one specific example, in the ideal case when noise is equal to zero, intensity of reference frame pixels can be calculated as a function of a current frame pixel intensity as shown below in Equation 1:

$$I_r^m = \frac{I_{r_{max}} - I_{r_{min}}}{I_{C_{max}} - I_{C_{min}}} I_C + I_{r_{min}} \qquad \text{Equation (1)}$$

where $I_r$ is intensity of a reference frame and $I_C$ is intensity of a current frame. Applying this conversion to the intensities of the pixels of the current frame will normalize the pixels with intensities of pixels for the reference frame.

Figure 3:
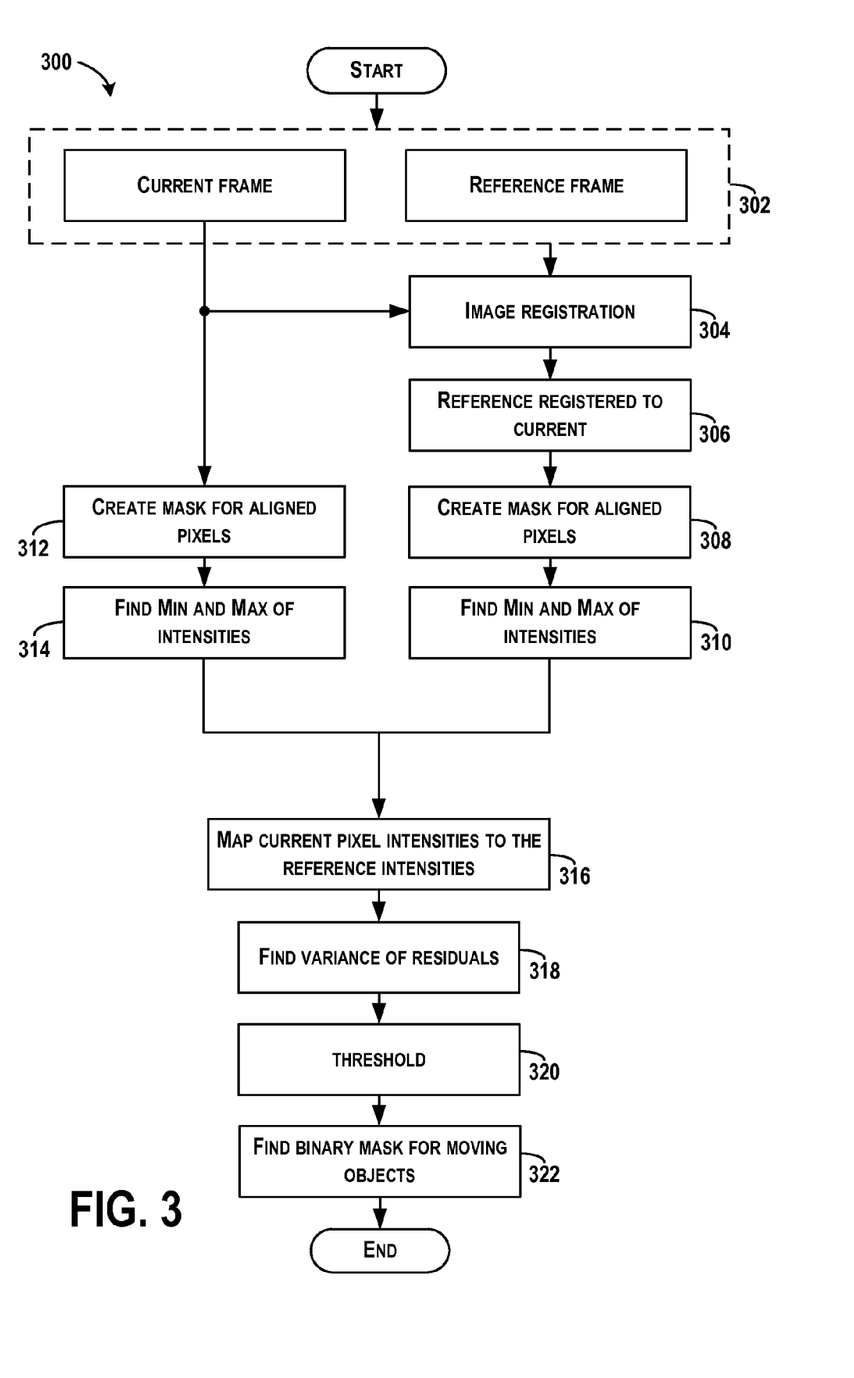
FIG. 3 shows a flowchart of an example method for normalizing intensities of two different frames and finding changes caused by moving objects, according to an example embodiment.

FIG. 3 shows a flowchart of an example method 300 for normalizing intensities of two different frames and finding changes caused by moving objects. As described above with FIG. 2, each block in FIG. 3 may represent a module, a segment, or a portion of program code, which includes one or more instructions executable by a processor for implementing specific logical functions or steps in the process.

The algorithm in FIG. 3 uses two frames. One is referred to as a current frame, and the other is a reference frame. Thus, at block 302, a current and reference frame are received. The reference frame is registered to the current frame using one of several registration techniques, as shown at image registration at blocks 304 and 306. After the registration, a mask is generated for regions of the frames that were aligned during the registration, as shown at blocks 308 and 312. This mask is created by registering the reference frame to the current frame, finding registered regions in the transformed registered frame, applying an erosion step to make this region smaller, and using this mask for both current and reference frames.

Pixels in both frames having the same (x, y) coordinates and located inside the mask will be aligned. At the next step, minimum (Min) and maximum (Max) values of the intensities in each frame are determined, as shown at blocks 310 and 314. After that, the intensities of the aligned pixels in the current frame are mapped using Equation (1), as shown at block 316, and differences for each pixel are calculated.

Figure 4A:
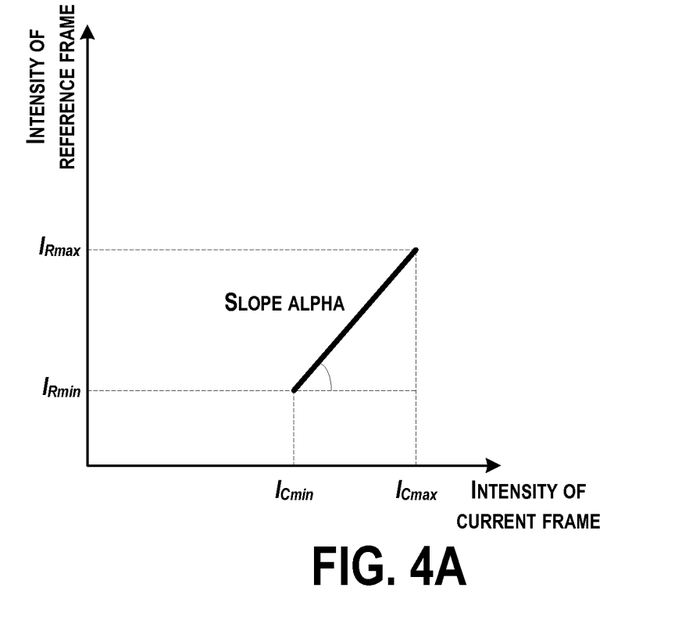
FIGS. 4A-4B illustrate example graphs and example scatter plots of intensity of image frames, according to an example embodiment.
Figure 4B:
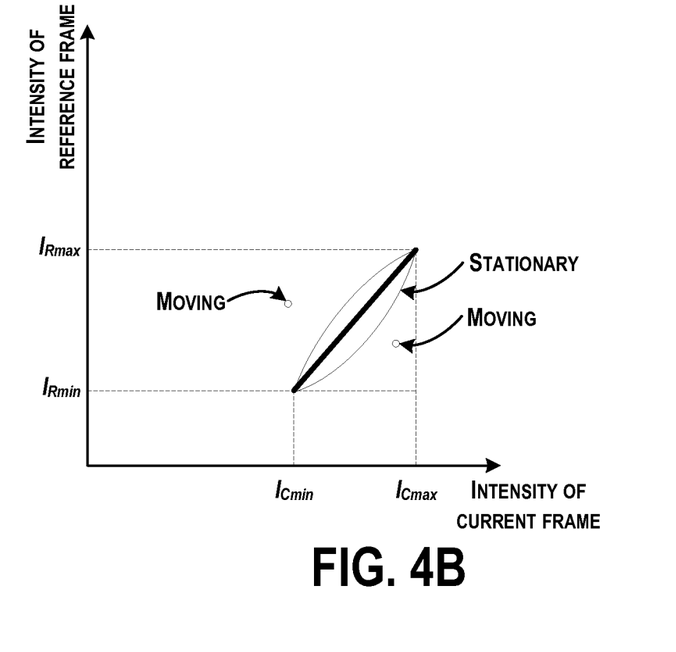

FIGS. 4A-4B illustrate graphs and scatter plots of intensity of image frames. FIG. 4A graphically illustrates Equation (1) to show correspondence between the intensity of the reference frame and the intensity of the current frame in a linear manner.

Referring back to FIG. 3, in the next step, a variance of all residuals are determined, as shown at block 318, and a threshold that is applied to all residuals is calculated, as shown at block 320. If a difference or residual is greater than a specified threshold, a corresponding pixel is marked as non-zero in the output binary mask, as shown at block 322.

FIG. 4B illustrates a scatter plot to show example pixel intensities for stationary and moving objects based on reference to the linear relationship. Pixels located in the ellipse correspond to stationary aspects of the image.

There are several methods that may be used for calculating a value of the threshold to generate the mask of the "moving" objects. A first method is based on the chi-square criteria, as shown below in Equation 2:

$$X^2(a, b) = \sum_{i=1}^{N} \left( \frac{y_i - a - bx_i}{\sigma_i} \right)^2 \qquad \text{Equation (2)}$$

where $x_i$ and $y_i$ are pixel intensities of the current and reference frame respectively, a is an offset and b a slope found using regression techniques described below, N is a number of pixel pairs used in the regression calculation and $\sigma_i$ is a standard deviation of the regression error.

After a left hand value is calculated, the threshold is determined by Equation 3 below:

$$V_t = 3.0 * \sqrt{X^2(a,b)/N} \qquad \text{Equation (3)}$$

A mask image is then created using the following procedure: for each pixel aligned by the registration step, a difference between an actual intensity value of the reference pixel and the predicted intensity value (e.g., using Equation 1) from the corresponding intensity of the current pixel is determined. If the difference is larger than the threshold, each mask pixel is marked as 1; otherwise as 0. All 1's in the mask image will show areas were objects are moving or change their intensities.

As another alternative example method to calculate the moving object threshold, a mean absolute deviation may be used as shown below in Equation 4:

$$\text{mean\_abs\_dev} = \frac{1}{N}\sum_{i=1}^{N}|y_i - a - bx_i| \quad \text{Equation (4)}$$

The process of generating the mask is the same as in the previous example, and the threshold can be calculated as shown below in Equation 5.

$$V_t = 3.0 * \text{mean\_abs\_dev} \quad \text{Equation (5)}$$

Within examples, this method of min/max works well when intensities of the changes stay inside the min and max values of the frames. An additional modified min/max method may be performed in other scenarios, in which after finding the min/max criteria as outlined in FIG. 3, additional functions of clustering of the intensities to remove clusters that are closer than a specified distance to the Min and Max values of the intensities can be performed. This may be used to remove extreme values causing incorrect regression of the intensities of the frames.

In other examples, since content of the frames can change significantly between current and reference frames (especially when the camera is moving), alternative processing may be performed, such as to use linear regression to realign intensities of corresponding pixels of two registered images: current and reference images. For example, referring back to FIG. 3, after the reference frame is registered and the mask is generated, the aligned pixels are converted into two vectors of a same length, e.g., a first vector including current pixels and a second vector of reference pixels. This process can be achieved by scanning both frames in the same order and adding pixels inside the mask to the corresponding vectors. In a next step, a least square fit can be performed that finds a linear mapping between the intensities of the current and reference pixels. A mask (with distance threshold) showing differences and motion is calculated the same way as for the Min/Max regression algorithm.

Further additional processing may be performed to reduce complexity for finding differences between frames. As an example, less number of samples can be used to find a linear regression. An occupancy matrix can be used to create a reduced data set, and the matrix can be constructed as a square array. Each side of the matrix has number of cells equal to N. A horizontal direction corresponds to a current frame's intensities mapped into N gradations, and a vertical direction corresponds to a reference frame intensity mapped to N gradations. The matrix is used to decimate an initial data set by setting an initial state of the matrix to zero for each cell. For each corresponding pair of pixels in the current and reference images that were previously aligned by registration, horizontal and vertical coordinates x and y are calculated. If content of the cell (x, y) is greater or equal to the specified Max count value, Cmax, then processing proceeds to the next pair of pixels. If the condition is negative, the count in the cell (x, y) is incremented and this pair of pixels is added to the vectors for regression calculation at the end of the procedure. After the reduced data set is generated, the regression is applied to the data set and the rest of processing is performed the same way as described above.

Within further examples, methods are described for finding differences in intensities of pixels between frames in the presence of spatially structured noise. Example images with structural noise may be images with vertical lines. Vertical lines may not be static and can be are different in each frame. The sensor may even produce consistent offset and gain, but in this case, the noise may stay as a largest factor in finding the correct differences between frames. Regression methods described above can be applied to each column separately in the case of vertically structured noise or horizontally in case of horizontal noise lines.

In addition, differences between two frames produced by the methods described above may result in both a real change and a ghost. Therefore, processing can be performed to separate "real" objects from their ghosts. Multiple reference frames can be used to remove ghosts. For example, a voting algorithm based on two reference frames can be used to find a "difference" mask using one of the methods above, and the reference frame can be acquired N frames before the current one. A registration is performed to align this reference frame to the current one. Then a "difference" mask using one of the methods above can secondly be generated with a reference frame acquired M frames before the current one. The registration is performed to align this reference frame to the current one. Overlapping regions in both masks can be identified, and these regions will correspond to the "real" objects, thus, eliminating the ghosts.

As described above, some sensors have manufacturing defects, damage, dust and other artifacts that cause a certain number of pixels to not change or change very little in intensity. Such sensors may be defective or no longer work properly. Their behavior is not related to content of the images and may cause a number of false detections. Dead pixels can result in an increase of false detections of moving targets as well stationary targets.

Figure 5:
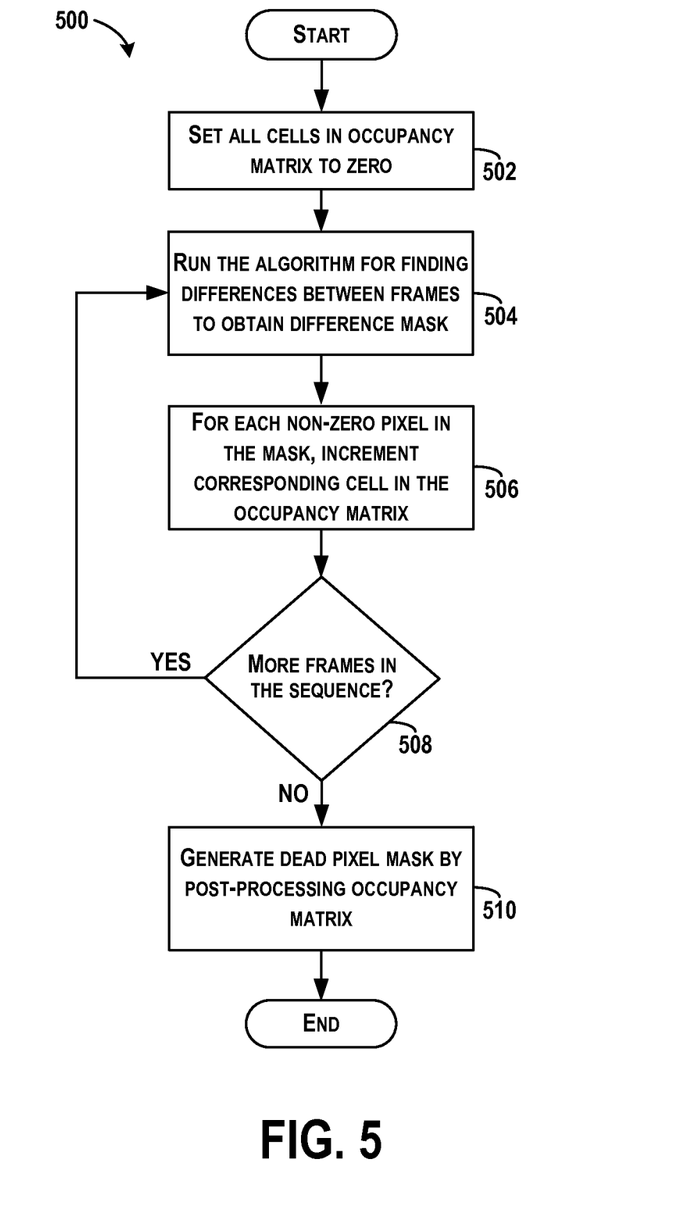
FIG. 5 shows a flowchart of an example method for offline dead pixel mask generation, according to an example embodiment.

Thus, within examples, methods of finding differences in frames described above can be used to further identify dead pixels. FIG. 5 shows a flowchart of an example method 500 offline dead pixel mask generation. As described above with other flowcharts, each block in FIG. 5 may represent a module, a segment, or a portion of program code, which includes one or more instructions executable by a processor for implementing specific logical functions or steps in the process.

Method 500 is based on the methods described above for finding differences between frames. First, an integer occupancy matrix is created of a size of an input frame and set all cells in the matrix to zero, as shown at block 502. Next, a sequence of frames is processed to generate a difference mask for each frame, as shown at block 504. For each non-zero element of the mask, a corresponding cell of the occupancy matrix is incremented, as shown at block 506. The process is repeated for all frames in the sequence, as shown at block 508. Dead pixels will generate differences in the same locations for each frame with a small number of exceptions; all other pixels will generate differences in different parts of the image depending on image content and motion. After processing the frames, the resulting occupancy matrix can be post-processed to find highest values that will correspond to the dead or defective pixels, as shown at block 510.

Within examples, post-processing can be accomplished applying a threshold to the occupancy matrix, and a value of the threshold may be between about 0.5N to about 0.9N, where N is a number of frames in the sequence of images used to generate the occupancy matrix. In other examples, a histogram may be used similar to above, but the threshold is based on a cumulative histogram of the occupancy matrix to select the highest values in the matrix.

The method 500 in FIG. 5 may be performed offline, or in other examples, may be performed for online discovery of dead pixels. For online discovery, a dead pixel mask is generated after processing a specified number of frames and the mask can be updated with every new frame. A dead pixel area has a significantly higher count than other areas. When the dead pixel mask is available, the mask is used to reduce false detections by excluding detections that overlap with, or are proximal to, dead pixels.

Figure 6A:
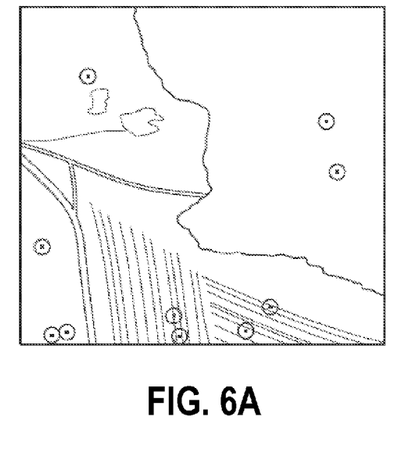
FIG. 6A is an example image frame in which dead pixels have been identified and circled, according to an example embodiment.
Figure 6B:
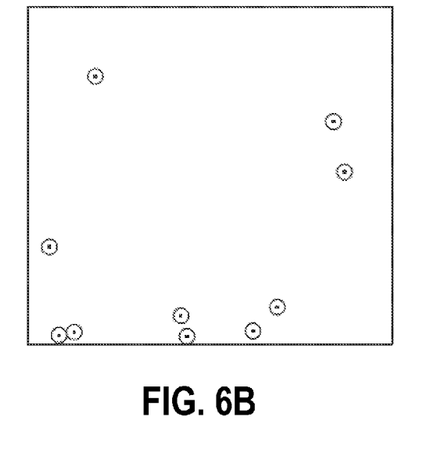
FIG. 6B is a resulting mask, in which only areas showing changes in intensity are circled, according to an example embodiment.

FIG. 6A is an example image frame, from a sequence of frames, that shows a terrain and in which dead pixels have been identified and circled. FIG. 6B is a resulting mask that has been generated to highlight only the dead pixel areas in the image, which are circled. The image in FIG. 6A has only stationary parts (e.g., a birds-eye view of an environment), and so all intensity changes for supposed moving objects result from inconsistent intensity values of pixels due to dead pixels, and the mask in FIG. 6B shows all dead pixels circled.

Figure 7A:
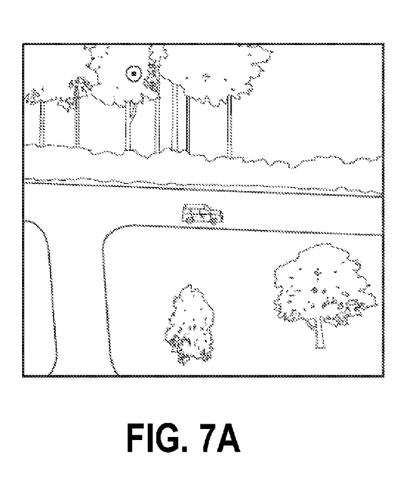
FIG. 7A shows another example image, and this image includes a moving car, according to an example embodiment.
Figure 7B:
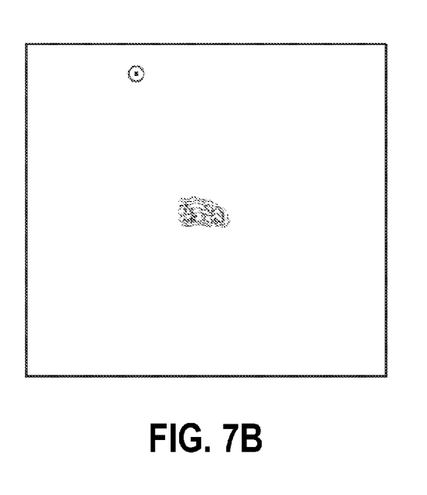
FIG. 7B shows an example mask of intensity values, according to an example embodiment.

FIG. 7A shows another example image, from a sequence of frames, and this sequence includes a moving car. FIG. 7B shows an example mask of intensity values over the course of the sequence of frames. A center area shows variation in intensity due to movement of the car across images in the sequence of frames. There is also a spurious intensity variation circled at the top, which does not represent moving objects. This is representative of a dead pixel, and can be identified as such using examples described herein.

Figure 8:
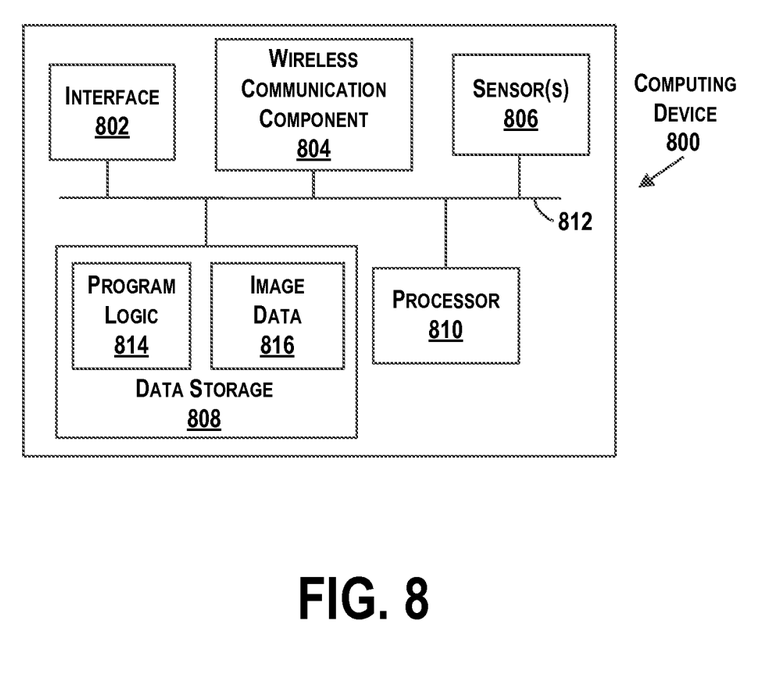
FIG. 8 illustrates a schematic drawing of an example computing device, according to an example embodiment.

As mentioned, portions of methods described herein may be performed by a computing device (or components of a computing device), as well as by components of elements shown in FIG. 1. FIG. 8 illustrates a schematic drawing of an example computing device 800. The computing device 800 in FIG. 8 may represent or include devices shown in FIG. 1 including the processor 112, the data storage 116, and display 120, for example, or the computing device 800 may represent the system 100 in general. In some examples, some components illustrated in FIG. 8 may be distributed across multiple computing devices. However, for the sake of example, the components are shown and described as part of one example device 800. The computing device 800 may be or include a mobile device, desktop computer, email/messaging device, tablet computer, or similar device that may be configured to perform the functions described herein.

The computing device 800 may include an interface 802, a wireless communication component 804, sensor(s) 806, data storage 808, and a processor 810. Components illustrated in FIG. 8 may be linked together by a communication link 812. The computing device 800 may also include hardware to enable communication within the computing device 800 and between the computing device 800 and another computing device (not shown), such as a server entity. The hardware may include transmitters, receivers, and antennas, for example.

The interface 802 may be configured to allow the computing device 800 to communicate with another computing device (not shown), such as a server. Thus, the interface 802 may be configured to receive input data from one or more computing devices, and may also be configured to send output data to the one or more computing devices. In some examples, the interface 802 may also maintain and manage records of data received and sent by the computing device 800. The interface 802 may also include a receiver and transmitter to receive and send data. In other examples, the interface 802 may also include a user-interface, such as a keyboard, microphone, touchscreen, etc., to receive inputs as well.

The wireless communication component 804 may be a communication interface that is configured to facilitate wireless data communication for the computing device 800 according to one or more wireless communication standards. For example, the wireless communication component 804 may include a Wi-Fi communication component that is configured to facilitate wireless data communication according to one or more IEEE 802.11 standards. As another example, the wireless communication component 804 may include a Bluetooth communication component that is configured to facilitate wireless data communication according to one or more Bluetooth standards. Other examples are also possible.

The sensor 806 may include one or more sensors, or may represent one or more sensors included within the computing device 800. Example sensors include an accelerometer, gyroscope, light sensors, IR sensors, microphone, camera, or other location and/or context-aware sensors.

The data storage 808 may store program logic 814 that can be accessed and executed by the processor 810. The data storage 808 may also store collected sensor data or image data 816.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure. Various modifications, as are suited to the particular use, are contemplated.

What is claimed is:

1. A method of detecting dead pixels of image frames, the method comprising:
   receiving, at a computing device, a sequence of image frames;
   aligning, from the sequence of image frames, pairs of image frames;
   for a given pair of image frames, determining differences in intensity of corresponding pixels between the aligned pair of image frames;
   based on the differences in intensity of corresponding pixels between the aligned pair of image frames, generating by the computing device mask images indicative of areas in the pairs of image frames having moving objects;
   determining, within the mask images, common pixel locations indicative of areas in the pairs of image frames having moving objects over a portion of the sequence of image frames; and
   based on a number of the common pixel locations for a given pixel location being above a threshold, identifying the given pixel location as a dead pixel.

2. The method of claim 1, wherein aligning, from the sequence of image frames, the pairs of image frames comprises aligning a first image frame to a second image frame so as to remove motion of a capture device providing the sequence of image frames.

3. The method of claim 1, wherein generating the mask images indicative of areas in the pairs of image frames having moving objects comprises:
   determining a minimum value and a maximum value of intensities in the given pair of image frames;
   normalizing intensity values of the aligned pairs of image frames based on a conversion factor between intensities of a first image frame and a second image frame for the given pair of image frames, wherein the conversion factor is based on a fraction of differences between the minimum value and the maximum value of intensities for the given pair of image frames;

for each pixel of a second image frame, determine a difference between an actual intensity value and a normalized intensity value; and based on the difference being greater than a specified threshold, identify a pixel location for the pixel as having a moving object.

4. The method of claim 1, wherein the sequence of image frames are collected by a sensor, and the method further comprises:

generating a mask representative of dead pixels of the sensor using identified dead pixel locations, wherein the dead pixels change in intensity in a way unrelated to an observed object.

5. The method of claim 4, further comprising:

processing the sequence of image frames to generate the mask representative of the dead pixels of the sensor; and updating the mask representative of the dead pixels of the sensor in real-time as new image frames are received.

6. The method of claim 4, further comprising:

applying the mask to the sequence of image frames to remove false data indicative of moving objects that is present within or overlaps any of the dead pixel locations.

7. The method of claim 1, further comprising:

removing data of the given pixel location identified as a dead pixel from the mask images indicative of areas in the pairs of image frames having moving objects; and outputting an indication of the moving objects.

8. The method of claim 1, further comprising:

normalizing intensity of the aligned pairs of image frames based on a linear regression between intensities of a first image frame and a second image frame for a given pair of image frames.

9. The method of claim 1, further comprising:

removing ghost images from the mask images by comparison of a current mask image to a prior mask image for the sequence of image frames, wherein the ghost images are representative of duplicate data created during mask generation.

10. The method of claim 9, further comprising:

identifying overlapping regions in the current mask image and the prior mask image;

marking the overlapping regions to be representative of the areas in the pairs of image frames having moving objects; and marking non-overlapping regions as including ghost images.

11. The method of claim 1, wherein the dead pixel includes data unrelated to content of an image representative of an observation.

12. The method of claim 1, wherein the dead pixel includes data indicative of a false moving object.

13. The method of claim 1, wherein the threshold is between 0 and N, where N is a maximum pixel intensity value.

14. The method of claim 1, wherein receiving the sequence of image frames comprises receiving, at the computing device, the sequence of image frames from a sensor, and wherein identifying the given pixel location as the dead pixel comprises identifying, by the computing device, the given pixel location as the dead pixel.

15. A non-transitory computer readable medium having stored thereon instructions that, upon being executed by a computing device, cause the computing device to perform functions comprising:

receiving a sequence of image frames;

aligning, from the sequence of image frames, pairs of image frames;

for a given pair of image frames, determining differences in intensity of corresponding pixels between the aligned pair of image frames;

based on the differences in intensity of corresponding pixels between the aligned pair of image frames, generating mask images indicative of areas in the pairs of image frames having moving objects;

determining, within the mask images, common pixel locations indicative of areas in the pairs of image frames having moving objects over a portion of the sequence of image frames; and based on a number of the common pixel locations for a given pixel location being above a threshold, identifying the given pixel location as a dead pixel.

16. The non-transitory computer readable medium of claim 15, wherein the sequence of image frames are collected by a sensor, and the functions further comprise:

generating a mask representative of dead pixels of the sensor using identified dead pixel locations, wherein the dead pixels change in intensity in a way unrelated to an observed object; and applying the mask to the sequence of image frames to remove false data indicative of moving objects that is present within or overlaps any of the dead pixel locations.

17. The non-transitory computer readable medium of claim 15, wherein the functions further comprise:

removing data of the given pixel location identified as a dead pixel from the mask images indicative of areas in the pairs of image frames having moving objects; and outputting an indication of the moving objects.

18. A system comprising:

one or more sensors for collecting image frames of an environment;

one or more processors for performing functions comprising:

receiving a sequence of image frames from the one or more sensors;

aligning, from the sequence of image frames, pairs of image frames;

for a given pair of image frames, determining differences in intensity of corresponding pixels between the aligned pair of image frames;

based on the differences in intensity of corresponding pixels between the aligned pair of image frames, generating mask images indicative of areas in the pairs of image frames having moving objects;

determining, within the mask images, common pixel locations indicative of areas in the pairs of image frames having moving objects over a portion of the sequence of image frames; and based on a number of the common pixel locations for a given pixel location being above a threshold, identifying the given pixel location as a dead pixel.

19. The system of claim 18, wherein the one or more processors further perform functions comprising:

generating a mask representative of dead pixels of the one or more sensors using identified dead pixel locations, wherein the dead pixels change in intensity in a way unrelated to an observed object; and updating the mask representative of the dead pixels of the sensor in real-time as new image frames are received.

20. The system of claim 19, wherein the one or more processors further perform functions comprising:

applying the mask to the sequence of image frames to remove false data indicative of moving objects that is present within or overlaps any of the dead pixel locations.

* * * * *